United States Patent [19]

Petterson

[11] Patent Number: 4,686,441

[45] Date of Patent: Aug. 11, 1987

[54] PHOTO ELECTRIC CHARGER DEVICE FOR LOW POWER ELECTRICAL DEVICE

[76] Inventor: Tor Petterson, 31248 Palos Verdes Dr. West, Palos Verdes, Calif. 90274

[21] Appl. No.: 708,434

[22] Filed: Mar. 4, 1985

[51] Int. Cl.$^4$ ............... H02J 7/00; H01M 10/46
[52] U.S. Cl. ................................. 320/2; 136/291
[58] Field of Search ........................ 320/2-5, 320/6, 15; 136/291

[56] References Cited

U.S. PATENT DOCUMENTS

| | | | |
|---|---|---|---|
| 3,684,941 | 8/1972 | Van Acker et al. | 320/2 |
| 3,696,283 | 10/1972 | Ackley, III | 320/15 X |
| 4,209,346 | 6/1980 | King | 320/2 X |
| 4,539,516 | 9/1985 | Thompson | 320/3 X |

Primary Examiner—R. J. Hickey
Attorney, Agent, or Firm—Edward A. Sokolski

[57] ABSTRACT

A photo electric charger device includes a solar-electric panel for generating a charging current for a chargeable battery. Mounted on a common support member with the solar-electric panel are a pair of electrical contacts connected to receive the voltage output of the panel therebetween. These contacts are mounted on a pair of support arms which support a battery powered device having chargable batteries and a charging circuit for such batteries. A support bracket is provided for this device, the bracket having contacts which mate with and provide electrical contact with the contacts carrying the output of the solar panel which are on the support arms. Thus when the battery powered device is suspended on the support arms, current from the solar panel will feed through the contacts to charge the battery.

7 Claims, 6 Drawing Figures

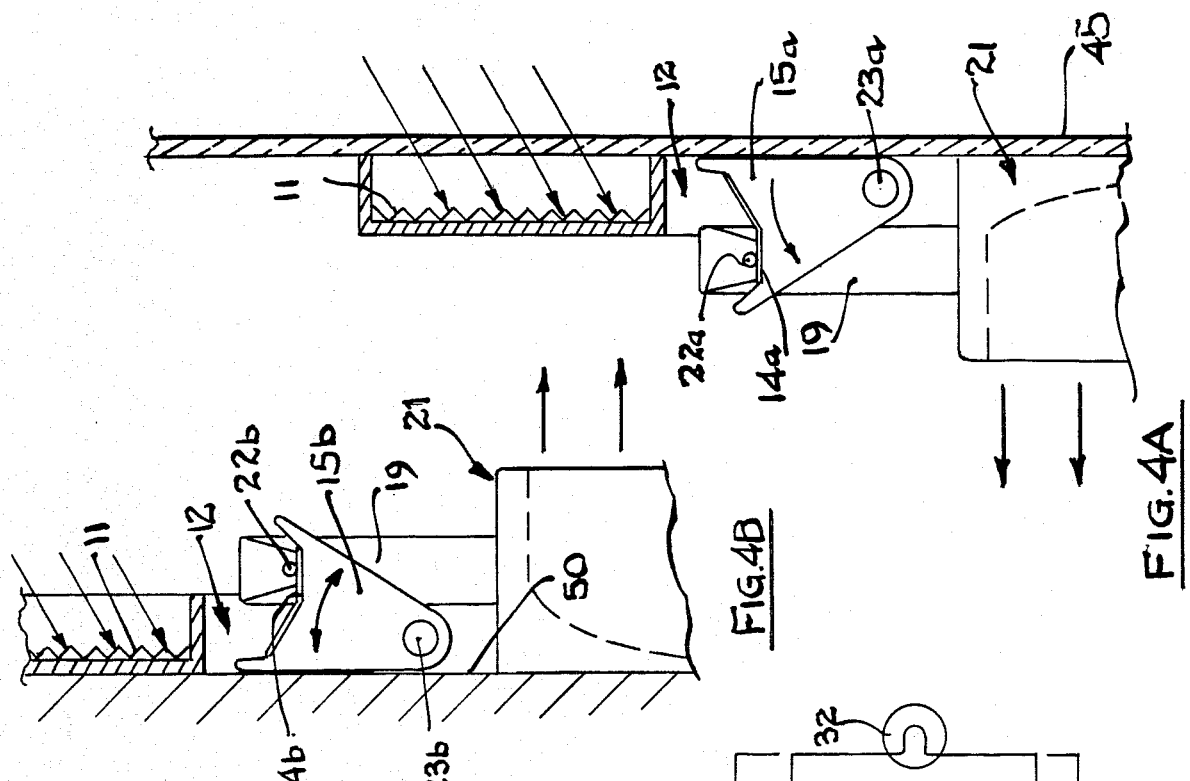
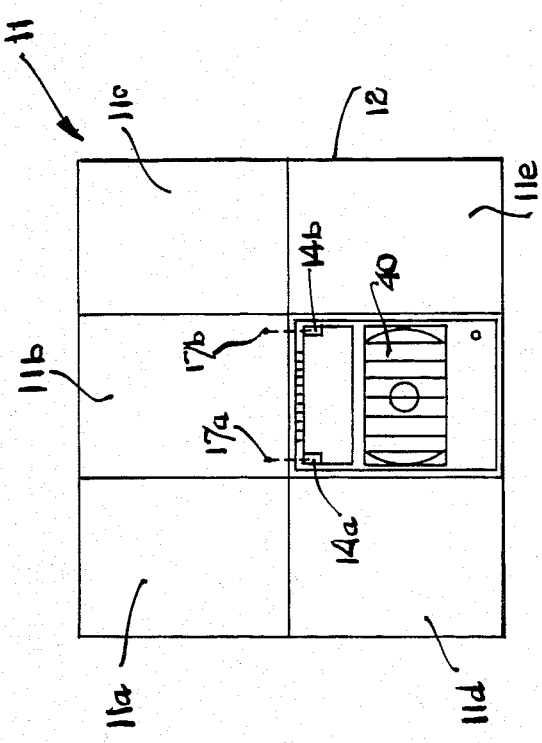
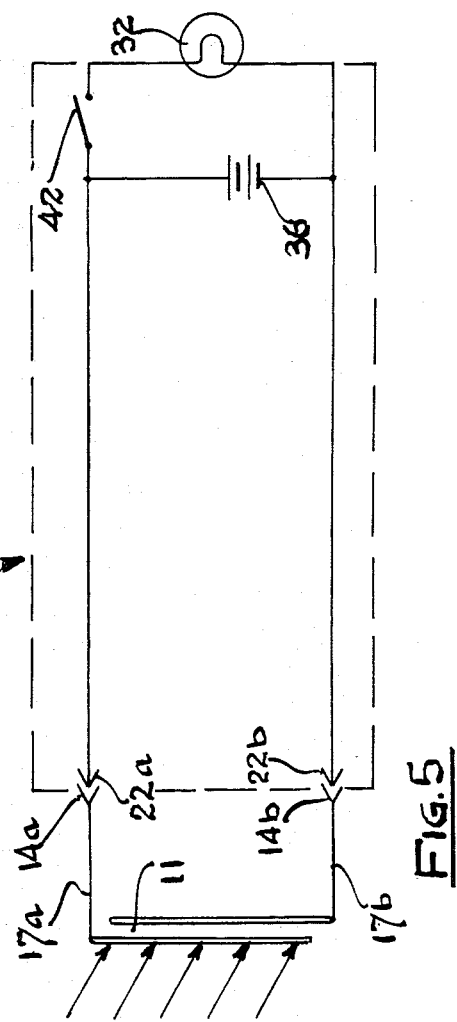

PHOTO ELECTRIC CHARGER DEVICE FOR LOW POWER ELECTRICAL DEVICE

This invention relates to battery chargers and more particularly to such a device employing a solar-electric panel to provide the charging current.

Solar-electric panels have been developed for providing sufficient current to charge batteries with the energy derived from light which may be either natural or artifical. Devices of this type are described in U.S. Pat. Nos. 4,009,051 to Kazis et al; 4,164,698 to Kleeberg and 4,243,928 to Nazimek. The device of the present invention is an improvement over those of the prior art in providing a convenient combined structure for facilitating the charging of the batteries for a device such as a lantern or flash light, a burglar alarm, a smoke detector, a clock or other device. The improvement of the present invention is involved with a solar-electric panel which can be conveniently mounted on a wall or window and which has arms extending therefrom on which the device having the batteries to be charged can be suspended. The arms have electrical contacts thereon to which the output of the solar panel is connected. The device having the batteries to be charged has mating arms with contacts which engage those of the solar-electric panel arms thereby providing charging current to the chargeable batteries used for powering the device. When the flashlight or other device is not in use, can be placed in a stored position on the support hooks where it is kept properly charged and when needed may merely be removed from the hooks.

It is therefore an object of this invention to facilitate the charging of batteries employed to power a lantern or the like.

It is a further object of this invention to provide a solar-electric powered device which is charged in a convenient stored position and is available for ready removal from its stored position for utilization in another position.

Other objects of this invention will become apparent as the description proceeds in connection with the accompanying drawings of which:

FIG. 1 is a front elevational view of an embodiment of the invention employing a portable lantern;

FIG. 4A is a cross-sectional view illustrating a second embodiment of the invention as mounted for using exterior light as its energy source;

FIG. 4B is a cross sectional view showing the embodiment of FIG. 4A mounted for using interior light as its energy source;and FIG. 5 is a schematic view illustrating the electrical circuitry of the embodiments of FIG. 1.

Figure 3:
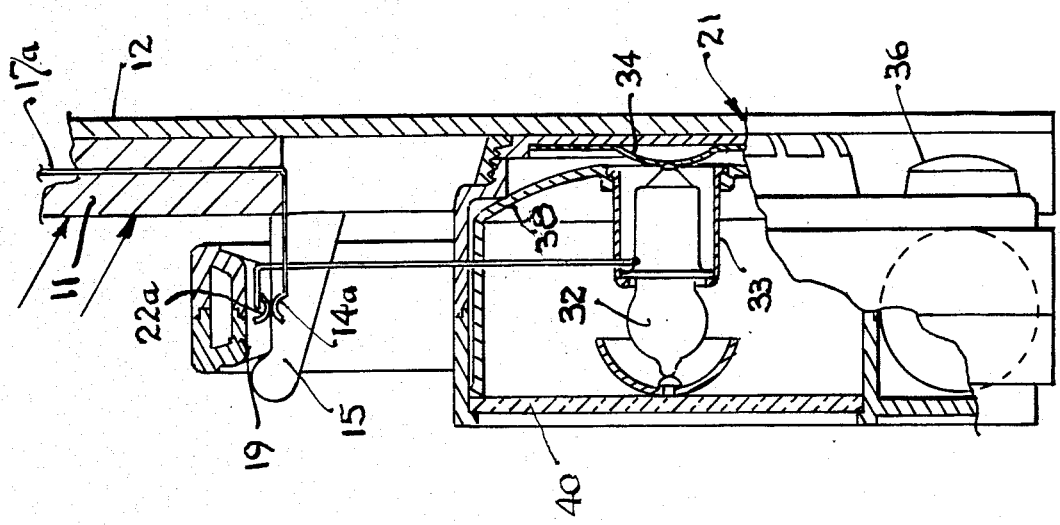
FIG. 3 is a side elevational view of the device of FIG. 1 with partial cut away section.
Figure 2:
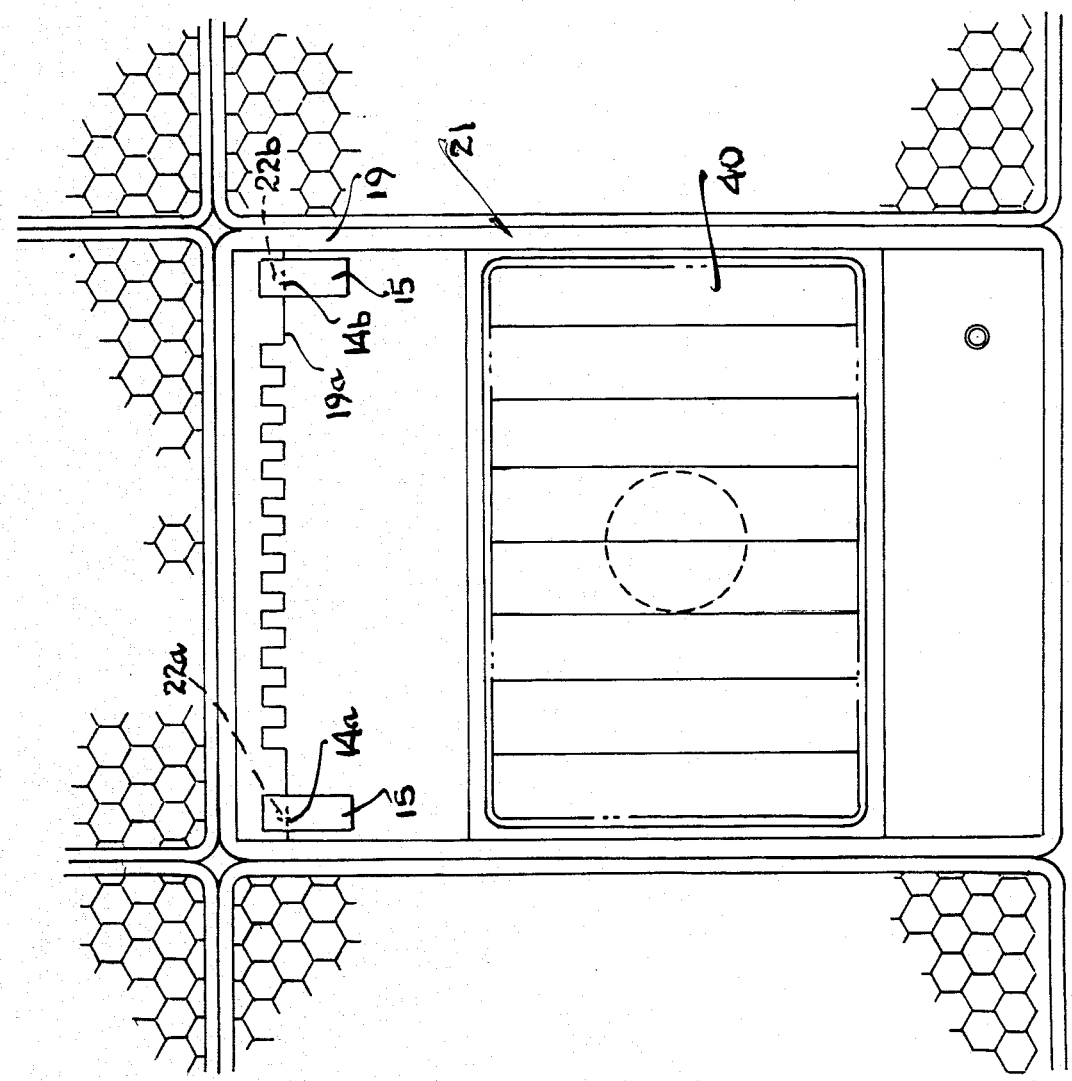
FIG. 2 is a front elevational view illustrating the embodiment of FIG. 1 in greater detail.

Referring now to FIGS. 1–3 an embodiment of the invention employing a portable lantern is illustrated. An array 11 of solar-electric cells which comprises a plurality of panels 11a–11e of such cells are mounted on a support panel 12 by suitable means such as for example cementing. Such solar panels are commercially available and generally employ solar electric diodes which can be combined to provide various voltage and current outputs. The output of solar array 11 is connected between charger contacts 14a and 14b. Contacts 14a and 14b are mounted on and fixedly attached to arms 15 which are supported on support panel 12. Electrical leads 17a and 17b are connected to contacts 14a and 14b respectively these leads in turn being connected to receive the output of the solar panels. Suspended on arm 15 by means of U-shaped support bracket 19 is lantern 21. Support bracket 19 also serves as a handle for the lantern and has a pair of electrical contacts 22a and 22b mounted at the opposite ends of the inside surface 19a of such bracket. At least the surface 19a of bracket 19 is electrically insulative, and with the lantern mounted on arms 15 as shown in the figures, contacts 22a and 22b abut against contacts 14a and 14b respectively providing electrical contact therebetween. Contacts 22a and 22b are connected to the batteries 36 of the lantern as to be described in connection with FIG. 5.

The lighting circuit portions of the lantern 21 may be of conventional design including a lamp 32 connected through contactors 33 and 34 and "on/off" switch 42 to the batteries 36. A typical parabolic reflector 38 and lens 40 are provided for the lantern.

Referring now to FIG. 5, when the lantern 21 is mounted into position with its bracket 19 resting on arm 15 and with contacts 22a and 22b in contact with contacts 14a and 14b respectively, current from photo cells 11 is fed to to battery 36 which may comprise a pair of chargeable dry cells. Switch 42 is used to connect battery 36 to light bulb 32 to affect the illumination thereof when so desired.

Referring now to FIGS. 4A and 4B, an alternative configuration for the solar panel arrangement of the device of the invention is schematically illustrated. In this embodiment, rather than always having the solar panels face inwardly towards the ambient light, the solar panels may be either mounted to face in an opposite direction to lantern 21 against a glass window 45 or may be mounted to face inwardly as shown in FIG. 4B. This end result is achieved by employing a pivotally mounted pair of symmetrical support arms 15a and 15b which have contacts 14a and 14b respectively, which extend therealong and which respectively abut against contacts 22a and 22b of support bracket 19. Paired arms 15a and 15b are pivotally mounted on support panel 12 by means of pivot pins 23a and 23b respectively and in their operative positions abut against wall 50 as shown in FIG. 4B or window 45, as shown in FIG. 4A. Support panel 12 may be mounted on window 45 or wall 50 by means of Velcro fasteners, suction cups, or the like. Otherwise the operation of the device is the same as for the first embodiment.

The device of the present invention thus provides a convenient means for maintaining the batteries of a device such as a lantern, etc. in a charging state while it is being stowed, the energy for such charging being provided by natural or artifical light. Thus the device of the present invention is suitable for use in emergency situations where normal power is interrupted with the device being readily removable from its stowed position when needed or operative in this position if necessary as the situation may require. While the device has been described in connection with a lantern it could be also used for other devices such as clocks, smoke detectors, burglar alarms, etc.

While the device has been described and illustrated in detail, it is to be clearly understood that this is intended by way of illustration and example only and is not to be taken by way of limitation, the spirit and scope of the invention being limited only by the terms of the following claims.

I claim:

1. A photo electric charger device for providing a charging current to a chargeable battery having electrical terminals comprising:
   support means comprising a panel;
   photo-electric cell means comprising an array of photo-electric cells mounted on said panel;
   first electrical contact means connected to receive the electrical output of said photo-electric cell means;
   arm means for supporting said first contact means, said arm means being mounted on said support means;
   means for supporting said chargeable battery;
   second electrical contact means;
   means for electrically coupling the second electrical contact means to the electrical terminals of the battery; and
   support bracket means attached to the battery for providing a mount for said second electrical contact means;
   said support bracket means being removably supported on said arm means with said first contact means in abutment against said second contact means and in electrical contact therewith.

2. The device of claim 1 wherein said arm means comprises a pair of arms each of said arms supporting one of said contacts.

3. The device of claim 2 and additionally including an electrically operative device connected to receive the electrical ouput of said batteries, the support bracket means forming a handle for said electrically operative device.

4. The device of claim 2 wherein said arms are pivotally mounted on the panel.

5. A photo electric charger device for providing a charging current to a chargeable battery having electrical terminals comprising:
   support means;
   photo-electric cell means mounted on said support means;
   first electrical contact means connected to receive the electrical output of said photo electric cell means;
   a pair of arms for supporting said contact means, said arms being pivotally mounted on said support means;
   means for supporting said chargeable battery;
   second electrical contact means;
   means for electrically coupling the second electrical contact means to the electrical terminals of the battery; and
   support bracket means attached to the battery for providing a mount for said second electrical contact means;
   said support bracket means being removably supported on said arm means with said first contact mens in abutment against said second contact means and in electrical contact therewith;
   the arms being symmetrical and the first electrical contact means extending along said arms such that said support bracket means can alternatively be supported on said arms on either one of the opposite sides of said photo-electric cell means with the cell means alternatively facing in a first direction or the direction opposite to said first direction.

6. The device of claim 5 wherein said first and second electrical contact means each comprises a separate pair of electrical contacts, each of the contacts of one pair being in abutment against and in electrical contact with a separate corresponding contact of the other pair.

7. The device of claim 6 wherein said support means comprises a panel and said photo-electric cell means comprises an array of photo-electric cells mounted on said panel.

* * * * *